United States Patent [19]
Decker

[11] Patent Number: 5,481,827
[45] Date of Patent: * Jan. 9, 1996

[54] METHOD FOR MANUFACTURING SOD

[75] Inventor: Henry F. Decker, Ostrander, Ohio

[73] Assignee: Buckeye Bluegrass Farms, Ostrander, Ohio

[ * ] Notice: The portion of the term of this patent subsequent to Jan. 21, 2008, has been disclaimed.

[21] Appl. No.: 221,793

[22] Filed: Apr. 1, 1994

Related U.S. Application Data

[63] Continuation-in-part of Ser. No. 2,263, Jan. 8, 1993, abandoned, which is a continuation-in-part of Ser. No. 590,692, Oct. 1, 1990, Pat. No. 5,177,898, which is a continuation-in-part of Ser. No. 224,939, Jul. 27, 1988, Pat. No. 4,986,026.

[51] Int. Cl.$^6$ .................................................. A01C 1/04
[52] U.S. Cl. ................... 47/58; 47/56; 47/1.01
[58] Field of Search .................. 47/58.25, 1 F, 47/56, 665

[56]                References Cited

U.S. PATENT DOCUMENTS

| 3,863,388 | 2/1975 | Loads | 47/56 |
| 4,357,780 | 11/1982 | Ball | 47/56 |
| 4,716,679 | 1/1988 | Heard | 47/56 |
| 4,934,094 | 1/1990 | Walton | 47/56 |
| 5,205,068 | 4/1993 | Solomon | 47/56 |

FOREIGN PATENT DOCUMENTS

| 2552620 | 4/1985 | France | 47/56 |
| 5234534 | 9/1977 | Japan | 47/56 |
| 108534 | 8/1980 | Japan | 47/56 |
| 52-34572 | 7/1983 | Japan | 47/9 |
| 60-5923 | 1/1985 | Japan | 47/9 |
| 60-168821 | 9/1985 | Japan | 47/58.25 |
| 2138583 | 1/1987 | Japan | 47/9 |
| 62-222570 | 5/1987 | Japan | 47/9 |
| 63-105615 | 5/1988 | Japan | 47/9 |
| 2124037 | 5/1990 | Japan | 47/9 |
| 2222620 | 9/1990 | Japan | 47/9 |
| 0803904 | 2/1981 | U.S.S.R. | 47/59 CO |
| 13067 | 3/1913 | United Kingdom | 47/56 |
| 2200828 | 8/1988 | United Kingdom | 47/58.25 |

*Primary Examiner*—Henry E. Raduazo
*Attorney, Agent, or Firm*—Isaac Angres

[57]                ABSTRACT

A novel mulch/medium/matrix method that stabilizes sods grown on a solid base in large rolls in contiguous beds is described. A vegetative or organic mulch is placed over a solid base which is typically plastic sheeting. A suitable growing medium is infiltrated into the mulch, filling the voids and interstices to produce a coherent matrix which is stable in severe thunderstorms. Seed or sprigs are placed into the matrix either before or after the application of the growing medium which is then irrigated, fertilized, and eventually mowed in the conventional manner. The primary rooting of the growing material intertwines the mulch/medium/matrix and binds and knits it into a sod. As the mulch gradually decomposes, it is replaced by primary rooting forming a thin, bona fide sod which can be one half the weight of a conventional mineral sod. The sod is harvested in large rolls, typically four feet wide and comprising 20–50 square yards. These big rolls are laid at the installation site by the grading tractor, obviating a fork lift, pallets, and a large laying crew characteristic of conventional sodding.

16 Claims, 1 Drawing Sheet

METHOD FOR MANUFACTURING SOD

This application is a continuation-in-part of my application, Ser. No. 08/002,263 filed Jan. 8, 1993, now abandoned, which is a continuation in part of Ser. No. 07/590,692, filed Oct. 1, 1990, now U.S. Pat. No. 5,177,898, which is a continuation in part of U.S. Ser. No. 07/224,939, filed Jul. 27, 1988, now U.S. Pat. No. 4,986,026.

TECHNICAL FIELD

This invention relates generally to sod production and more particularly relates to the rapid growth of sod over an impervious surface.

BACKGROUND ART

The concept of growing grass sod over a solid or impermeable base such as concrete or plastic sheeting goes back, as far as I know, to experiments conducted by the O. M. Scott Co. in Marysville, Ohio, starting in the summer of 1965. Bluegrass sod was grown over concrete on the front yard of the publisher of the local newspaper. It was grown successfully this way for several years, widely publicized, and used in O. M. Scott Co. advertising.

I started experimenting with and expanding the concept shortly thereafter at nearby Ohio Wesleyan University and demonstrated very shortly that it had several attractive features and advantages compared to the conventional system of growing sod on soil. First, and probably foremost, my research indicated that if grass seed was germinated in the suitable medium placed over a solid or impermeable base, typically 1–6 mil polyethylene sheeting or film, and given optimum growing conditions, the turfgrasses would begin to grow in such a manner that the primary rooting system of the grasses would quickly bind the growing medium into a sod. The sod, complete with the young rooting system, could be peeled or rolled intact and coherent after only a few weeks off the plastic sheeting or impermeable base. Various types of nettings could also be inserted into the growing medium which, as in conventional sodding, enhanced even further the speed with which the sod would be ready to harvest.

The quick formation of the sod was an obvious advantage over the conventional system for producing sod on soil in which 1–2 years or even more are required before the sod is knitted sufficiently to remain coherent when harvested with a sod cutter.

Conventional sod on soil requires the formation of rhizomes, tillers, secondary roots, and stolons, and the intertwining of these growth processes which take a relatively lengthy amount of time to bind the grasses and soil into a sod. The extensive primary rooting system is essentially lost in conventional sod production since it goes deep into the soil and is of little or no consequence in binding of the sod.

On the other hand, by germinating the seed over a solid base, such as plastic sheeting, the primary rooting of the seedlings is trapped, so to speak; and since the primary rooting is quite extensive (one rye seedling has been reputed to produce 17 miles of roots) it runs along the solid base through the growing medium and quickly binds it into a sod in a matter of a few weeks.

The feature of using the primary rooting system of grasses to speed the formation of sod seemed at the time useful and valid, and I incorporated the research into a patent disclosure (#012097) in July of 1972, followed a year later by a patent application (#371,4620). During the time, however, that the patent was being reviewed it became apparent that the methods did not translate well into the large scale type production demanded by the US sod industry. I could not make the transition from the greenhouse bench, laboratory, or small plot to a field scale production. I subsequently abandoned the patent application as being premature, but I did publish my observations in the trade magazine, *Weeds, Trees, and Turf*. The methods, as they existed at that time, were simply not cost effective in competition with the US sod industry which by the 1970's had become large in scale, efficient, and highly mechanized.

Other workers in Great Britain, such as Goodall, Dawson, and Load, faced similar difficulties and also the disadvantage that they were not familiar with the US sod industry. All of their processes failed the test of practicality and cost effectiveness. As a result, none of these inventions became commercially significant in the US because of inherent problems that at the time were difficult or even impossible to solve. The problems are discussed below:

First, and probably the main problem, has been the availability of an inexpensive, yet plentiful growing medium. Hundreds of things appear to work in a greenhouse or small plot until one considers the weight, cost availability, ease of handling, trucking, spreading, and the expense to bring the growing medium up to nutritional minimums.

Second, the amount of growing material required to cover an acre sheet of plastic one inch deep translates into 134 cubic yards or over 20 single axle dump truck loads per acre! Quantities of rooting material of this dimension, their handling, and manipulation are obviously too expensive to be competitive with the conventional sod on soil process.

Third, placing an exact amount of growing material (such as one-fourth inch as proposed by Loads) evenly over acres of plastic film proved very difficult. While it worked "indoors" under controlled conditions in a greenhouse flat, it could not be readily obtained on a field scale. Furthermore, one-fourth inch of material outdoors was an insufficient amount of rooting material under the best conditions. Even one inch of material was not successful: it could not be spread or maintained evenly. A slight thunderstorm of the type prevalent in the Midwest would sheet erode the growing medium, washing it off the plastic film or other base, causing gaps that prevented continuous rooting and hence sod formation.

Fourth, some provision had to be made to eliminate or at least reduce the effect of thunderstorms or heavy rains on the early stages of the sod development. Any upsetting of the thin patina of growing material over the base produced gaps and distortions that prevented continuous rooting and hence sod formation.

Fifth, another important consideration is damping-off disease. Since the primary rooting of the seeding will functionally knit the sod (rather than the secondary rooting, rhizomes, stolons, tillers of conventional sod), the seeding rate is increased which in turn increases the incidence of damping-off. This devastating disease is expensive and often impossible to control with fungicides.

Sixth, the use of foams, or containers as proposed by Dawson, or of curbs as proposed by Loads, or of burlap as proposed by Goodall, or of rolling up the plastic film to transport the grass as in Blackburn, were all too expensive to be considered. The process has no validity whatsoever unless the plastic film could be used over and over again.

Finally, seventh, conventional sodding is very labor intensive. Significantly reducing the amount of hard labor involved has to be a prime attribute of any alternative sodding system.

These major problems then, had to be solved before any alternative sodding system could literally get off the ground. Starting in the 1982 season several things began to make an alternative sodding system more feasible. In essence, it became possible to solve the problems.

First, around the country the Beltsville system of composting sewage sludge has begun to catch on. Suddenly, at least in Central Ohio, there is a readily available source of growing materials which in large quantities is being offered at an attractive price. This "Com-til" as it is called in Columbus, Ohio, was quickly determined to support the growth of tuffgrasses without amendment. It was not only charged naturally with the right nutrients for grass culture, but it was also established that it retarded the development of damping-off and other fungal diseases! Problems No. 1 and 5 above then were solved in one step.

Preliminary studies at Ohio Wesleyan University also indicated that, beside composted sewage sludge, it was possible to grow tall fescues as well as other cool and warm season perennial grasses, such as bluegrasses, bermudagrasses, bentgrasses, bahiagrasses, zoysiagrasses, ryegrasses, and fine fescues on other types of composted organic materials, such as composted animal manures and composted yard wastes. These latter materials could also be mixed with composted sewage sludges.

Next, I made the important discovery that wheat straw could be used not only to protect the solid base from truck and tractor traffic, but also to keep the growing medium in place in a thunderstorm. Furthermore, in the right condition, I discovered that the straw actually substituted for additional growing media, that is conferred some unidentified biological property in the mix that encourages the growth of turfgrasses. Thus, the straw made it possible to drastically reduce the amount of expensive growing medium required to effect a sod. In addition, it eliminated the problem of having to spread the medium on a solid base with a uniform thickness that was impossible to obtain. These new uses for straw were the most important discoveries made and effectively solved Problems 2,3,and 4.

Another recent important development in the turf industry has made an alternative sod more feasible: that is the introduction of turf-type tall or coarse fescues. These new turf cultivars have several advantages over bluegrass. They are more drought, insect, and disease resistant. They are more durable on playing fields and they germinate and root more quickly, more vigorously than bluegrass. On the other hand, the tall fescues do not produce rhizomes and stolons and hence do not lend themselves to conventional sod production. In practice these drawbacks are compensated for by growing the sod for a longer than usual period by laying sod netting and by adding bluegrass to the tall fescue seeding. The netting, however, is expensive and difficult to use, and the bluegrass in time is much more aggressive than the tall fescue. Eventually it takes over the turf with the new lawn becoming heterogeneous and the tall fescue scattering into unsightly clumps.

These apparent disadvantages to growing a tall fescue sod in a conventional manner turn out to be strengths when tall fescue is considered as the main ingredient of an alternative sod-grown on a solid base. The vigorous and rapid primary rooting gives the tall fescue cultivars a distinct advantage over the less vigorous bluegrass.

The tall fescue cultivars have one more subtle but very important advantage over other turfgrasses which I will explain. In the past, it has been impossible to find wheat straw that was totally free of unharvested wheat seed. In the production of an alternative bluegrass sod this wheat seed would germinate much more quickly than bluegrass, obscure it, and retard its development. As well, wheat seedlings are much more coarse than fine turf premium bluegrasses and do not readily mow out and then the new sod quickly becomes ragged, unattractive, and, in fact, unsaleable.

When tall fescue tuff is grown, however, the wheat seed germinates at about the same speed. Furthermore, the width and coarseness of the wheat blades is more comparable to that of the tall fescue when mowed close, and hence the new turf looks more uniform. As well, the wheat also has a vigorous primary rooting system which aids the rapid development of the sod. Initially, at least, the annual wheat withstands close mowing, even to an inch or less, and acts, in fact, as a beautiful nurse crop.

Another advantage to the tall fescue/wheat seeding is that it germinates quickly, in a matter of days, and hence lends to the new sod a more rapid resistance to thunderstorms than when bluegrass constitutes the primary seeding.

Technically speaking, it is important to my alternative system to start not just with wheat "straw", but, in fact, with the whole culm, including the inflorescence. Even a rotary combine will leave enough mature caryopses in the spikelets to benefit the early formation of the alternative tall fescue sod. No longer objectionable, the unharvested wheat seed is now desirable.

In summary, then, the tall fescue/wheat seeding germinates much more quickly than bluegrass; its coarse texture is homogeneous and not unattractive; and coupled with quick germination, is a very rapid, extensive, primary root growth. I have discovered that this tall fescue/wheat primary root growth is so vigorous that it can be grown with or without nettings, gels, absorbents, or any supplemental bluegrasses. Furthermore, the new sod can be produced in much less time and at considerable savings in weight than conventional tall fescue sod on soil.

The whole culms are spread about two inches deep over the solid base and now only 30–40 cubic yards of growing material/acre are required. This is spread over the straw and seeded conventionally. The rooting material fills the voids and interstices of the straw making a coherent, thunderstorm resistant, germinating matrix.

I discovered that in a few weeks the initial two inches of straw will compress and decompose into a mat or sod approximately one-half inch thick. The binding quality of the straw, plus the external primary rooting system of the grasses combine to make a bona fide sod of high quality.

Harvesting the alternative sod has a distinct advantage over conventional sodding techniques. With the primary rooting intact, the sod is lifted, grabbed, and cut (without cutting the plastic which will be used again), and then rolled off the plastic sheeting onto a tube by a harvesting mechanism of my design. In this manner, it is possible to produce rolls of sod much larger than the typically one yard sod sheets or rolls produced by Ryan, Princeton or Brouwer sod harvesters. I can produce sod rolls consisting of 30 square yards or more. Furthermore, a roll this size would have one/fifth as many seams as in conventional sodding comprised of one yard rolls. These large rolls are loaded directly; no pallet is required. At the laying site the rolls are unloaded and installed or unrolled by the grader and raker, thus obviating both a fork lift and a laying crew.

Continuing research and refinement since our earliest NSF grant in 1988 on what we have begun to call the Big Roll BioSod tuff system has shown that the basic concept described above of growing sods in a matrix consisting of a coarse vegetative mulch such as straw combined with a suitable growing medium such as composted sewage sludge or composted yard waste is very effective and economical. The system can utilize a wide variety of waste materials for the mulch and for the growing medium.

The main characteristics of a suitable mulch appear to be materials that are organic yet which decompose relatively slowly, that are sufficiently coarse so that they form voids, crevices or interstices into which the growing medium can filter, and that in forming a matrix with the growing medium are stable enough to resist sheet erosion in heavy thunderstorms. Besides straw and other vegetative stalks, several soft and hardwood barks and chips and materials such as pine needles or ground corncobs have been tested and can be used to form a coarse mulch over the plastic into which the growing medium can be infiltrated.

In regard to the growing medium part of the matrix, composted sewage sludges with reduced conductivity, various animal manures, or composted yard wastes, or the three in various combinations, appear in our tests to be high performing growing media requiring little if any amendment as reported in my earlier U.S. Pat. Nos. 4,986,026 and 5,177,898. We have also tested other waste type growing media which with litter or no modification can be made suitable for the system including spent diatomaceous earth and mushroom manures and some industrial pulps and municipal solid wastes. Some inorganics such as regular sands, fly ash, or flume sands also work well.

Grasses used for golf greens such as the bentgrasses and bermudagrasses, which are typically grown in sands, either directly on the ground or on sands placed over plastics, respond even better to being grown in nutrient rich "flume sands" (incinerated sludge), or "fly ash" (from burning coal), or the residues from burning municipal wastes.

Golf greens are often constructed from very specific mixes of sands and peats. A specific mix of this type as well can be used as the growing medium portion of the matrix in the Big Roll BioSod turf system.

Another important feature of growing golf green sods using this innovative turf system is that if both or at least one of the ingredients of the matrix are largely organic, and hence subject to eventual decomposition by the soil microbiota, then the mulch and growing medium will eventually disappear after the sod is laid on its final site. This is particularly important in the placement of a sod over a greens base where the porosity or drainage must remain intact. A coarse and disappearing sod base then is very useful in such a situation. Hence a matrix consisting of a coarse organic mulch that will decompose and an inorganic portion such as flume sand or regular sand that will blend with the greens base makes an ideal composition for a bentgrass or bermudagrass sod.

Besides testing seeded varieties of all cool and warm season turfgrasses, the research was expanded to include vegetative materials, such as stolons, and wildflowers mixed with prairie grasses or wildflowers grown alone.

It was found that bermudagrass stolons for example can replace seed very effectively in the mulch/medium/matrix turf system. The vegetative material is simply inserted into the matrix system, in place of the seed, typically after the mulch is applied to the plastic. The mulch can be reduced in amount to compensate for the coarse vegetative stalk quality of the stolons which are then covered lightly with a suitable growing medium and irrigated and grown as with a sod produced from seed.

Wildflower and prairie grass seed is handled and planted into our standard straw mulch/compost/matrix just like a tuffgrass seeding. Prairie grasses such as Little Bluestem, Junegrass, Side Oats Grama, and Sheeps Fescue perform in the matrix very much like turf type fescues; and random plot experiments have shown that standard wildflower mixes such as The Vermont Wildflower Farms' regional mixes or Prairie Nursery's Shortgrass Prairie medium soil mixture, annuals and perennials, all work well in the BioSod growing system.

We have also demonstrated that it is possible to grow a crown vetch/ryegrass sod for highway banks using our standard straw mulch/compost medium/matrix.

In more recent experiments with fine rather than coarse mulches we have been able to stabilize sods such as bentgrass or bermudagrass that are grown for golf greens using variations of the mulch/medium/matrix concept. In the case of Tifdwarf bermudagrass, certified sod or sprigs of the grass can be milled or ground up and applied to the plastic where in effect the planting material itself becomes the fibrous mulch. If this is not sufficient to complete the continuum over the plastic, or in the case of bentgrass seed, then it can be extended or amended by adding a suitable, sterile, fine mulch such as waste paper pulp, wood fibers, shredded newspaper, newspaper pellets, and others. USGA spec sand, or flume sand, or any growing medium is then infiltrated into the mulch to form the mulch/medium/matrix. This can be further stabilized and strengthened if necessary by applying another layer of fine mulch across the top of the sand/active extended mulch to form a sandwich that is highly resistant to laminar flow.

An important discovery in this method is that sods to be milled into planting material should be custom grown for the purpose. These sods should be grown on a light, organic mulch that makes the sod easier to handle and to mill. The organic mulch and the vegetative material are milled together and spread on the plastic to form a continuum which is then infiltrated with growing medium as above.

In our 1989 research season, we expanded the size of our test beds to 32 feet wide by 200 feet long or approximately 700 square yards. This size was selected because 700 yards represented approximately the size of the average lawn in Columbus, Ohio. It was also a decent load for the size truck we had available. This almost arbitrary idea was fortuitous: it became apparent that growing sod using the mulch/medium/matrix BioSod system in contiguous beds of a size that made a truckload, underlain with plastic, and separated by drain and irrigation lines, was very economical: For example a 700 (or more likely 1000 yard) truckload of sod can be harvested each day and then replanted the same day to be ready for harvest again in 7 or 8 weeks depending on the type of sod and the climate. The plastic is used over again and is protected from UV light by mulch shortly after being exposed by the harvesting of the sod. As well only a small part of the continuous production (only those beds a week or less old and hence not yet well rooted) is at risk each day from thunderstorms. Instead of having one massive field to plant and to harvest later all at once, the BioSod system shifts the elements of sod production onto a daily basis . . . more like a manufacturing rather than a farming process.

Other than the simple cost saving and environmental responsibility of using the plastic over and over again for subsequent crops, there are some more subtle advantages of saving the plastic and reusing it in place: First, if the land was graded properly before the plastic was laid excess water could be directed of the plastic to tile on the sides of each bed, hence obviating the need to place holes in the plastic to promote drainage into the soil beneath the plastic. Thus the beds remain dry in all weather and traffic can proceed over them earlier in the spring and later in the fall thus extending the sodding season.

Another significant feature in keeping the plastic intact is that growing the sod then requires much less water. Instead of the water percolating through the holes in the plastic down into the soil and lost, it is retained on the plastic where it can be absorbed by the grass roots. It is essentially a closed system in which even the drain lines and irrigation lines are underlain with plastic, and the runoff can be captured and used for re-irrigation. The tremendous quantity of primary grass roots that develop and spread across the plastic sheeting, form a gigantic adsorptive surface, and hence, an effective, natural, filtration system.

BRIEF DISCLOSURE OF INVENTION

An alternative, solid base, accelerated method for producing sod in big rolls is presented. The synthetic sod is produced by placing a carefully selected vegetative mulch over a root impervious solid base, typically 1-6 mil plastic sheeting, and then infiltrating the mulch with 30 to 50 cubic yards per acre of a suitable growing medium. Careful selection of a mulch and medium will yield an effective growing matrix for selected turfgrass cultivars. The relatively inexpensive mulch material protects the base from traffic; and it substitutes for and reduces the quantity of expensive growing medium required. It also obviates having to spread the growing medium to a uniform thickness that is difficult to obtain, and it forms a matrix with the medium that protects the entire system from sheet erosion in a thunderstorm.

An appropriate mulch/medium/matrix can be planted with seed sprig, stolon, plug, or milled sod and then irrigated and fertilized as in convention sodding. The primary rooting of the planting is trapped so to speak by the plastic base and quickly knits the mulch/medium/matrix into a bona fide sod, one-half inch or so thick, that can be harvested in large thirty yard rolls. The plastic is left in place to be used again; and since the primary rooting has been maintained and harvested intact when the sod is installed, it requires less water and time to become re-established at its new site.

A preferred example or embodiment of the mulch/medium/matrix concept is the growing of a tuff type tall fescue such as Loft's Rebel, on a straw mulch infiltrated with composted sewage sludge. This matrix has been demonstrated to maintain its stability over plastic in the first week of growth in a 4½ inch thunderstorm which would have destroyed any growing medium placed alone on plastic. Tall fescues are noted for their rooting capacity and Rebel grows very well on composted sewage sludge. Such a selection is capable of producing a harvestable sod, without netting or a bluegrass as in conventional tall fescue sod production, in as little as seven weeks.

DETAILED DESCRIPTION

Figure 1:
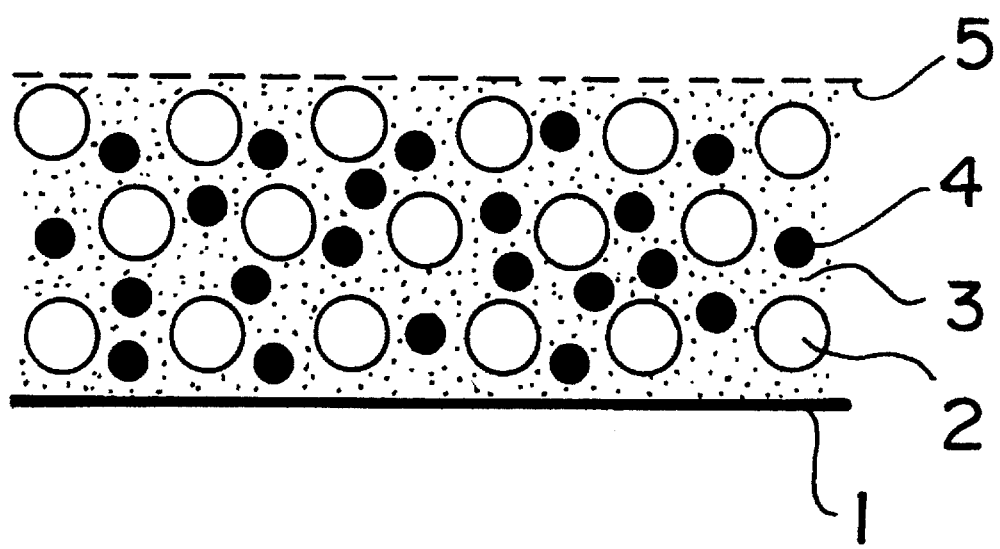
FIG. 1 is a schematic of the mulch/medium/matrix concept according to the invention.

A suitable coarse, fibrous, vegetative mulch (2) such as milled sod of the species to be grown into a sod is spread on a not impervious base (1). Sufficient quantities of a selected growing medium (3) are infiltrated into the mulch (2) to form a rain stable mulch/medium/matrix which is resistant to sheet erosion. Seed or sprigs (4) are sown into the matrix either before or simultaneous with the application of the growing medium (3). A secondary, fine mulch (5) can be applied over the matrix if additional stability is needed.

My research, supported in great part by the National Science Foundation, has led to the discovery of a vastly improved, yet simple, solid base, accelerated, alternative method for growing sods in large rolls. The solid base can be provided by any surface that restricts root penetration, but typically is 1–6 mil plastic sheeting or film unrolled over a graded bed of soil.

A vegetative or organic mulch is then spread to form a continuum over the solid base. The mulch will protect the base and act as a binder, filler, and absorbent. It was also discovered that it will substitute partially as a growing medium for the new seeding. Most important it will maintain the integrity of the growing system in a thunderstorm; and it also obviates the need to spread the subsequent growing medium at a uniform thickness that is difficult to obtain. Furthermore, the inexpensive mulch will drastically reduce the amount of typically more expensive growing medium required in the next step.

The function of the base then is to: protect the base, act as a binder, filler, and absorbent; reduce the amounts of growing media required; obviate the need to spread the medium with impossible accuracy; and to maintain the integrity of the whole system in a thunderstorm.

Several mulches have been tested and shown to perform the above functions well; shredded cypress bark; long leaf pine needles; oat, wheat, or barley straw; ground corn cobs; shredded and pelleted newspaper; wood fibers; and some types of hay.

A suitable growing medium is next spread over or infiltrated into the mulch filling its voids and interstices. Two media that have worked consistently well in my research have been composted yard waste and composted sewage sludge. Both are nutrient rich and will support grass growth with little amendment There is also some evidence that composts such as these provide resistance to damping off disease which is an important consideration at high seeding rates. Besides composted sewage sludge, composted yard waste, and municipal solid waste, a wide variety of inorganic growing media have been tested and proved workable: flume sand, fly ash, diatomaceous earth, and sands of various kinds and sizes including those typically specified for golf greens.

The amount of growing medium used depends on the type of mulch. An appropriate combination and amounts of mulch and medium have to be determined for each particular sod in order to acquire the desired matrix stability. The growing medium can be as little as 10 cubic yards per acre to as much as or more than 50 cubic yards per acre. It has to be worked out for each particular type of sod grown.

Seed is spread in a conventional manner evenly over the mulch/medium/matrix with a Brillion landscape seeder, a drop seeder, or hydroseeder. Or it can be applied pre-mixed with the medium.

Vegetative material such as bermudagrass sprigs or plugs or milled sod is typically applied with or after the mulch and before the growing medium.

Since primary rooting is the key to forming a quick sod, planting rates are usually raised by 20 percent or more above normal rate recommendations.

The sods are grown in contiguous beds of 1000 square yards each or in some economical unit such as truckload size that lends itself to daily production. The beds are shaped to drain water off quickly into 4" plastic tile one each side of a bed. A bed is planted the same day it is harvested more like a manufacturing than a farming process. This reduces the exposure of the plastic sheeting to UV light. As well only a few beds at a time, instead of whole fields, are at risk each day from thunderstorms. No holes are placed in the plastic which is used over and over again. The ground under the plastic is kept dry which facilitates the movement of equipment over the tuff and extends the sodding season.

The matrix is now irrigated and grown essentially like any conventional sod. As with conventional sod growing, standard fertilizers are added as needed, but few or nor herbicides or other pesticides are required. In grass sods mowing begins as soon as the grass is 1–2 inches high to encourage tillering. The primary rooting intertwines the mulch/medium/matrix and binds and knits it into a sod. As the mulch gradually decomposes, it is replaced by primary rooting.

After a few weeks the 1–2 inch layer of mulch has compressed and decomposed into the growing medium into a mat or sod about one-half inch thick. This is now harvested in big rolls, cut five feet more or less, wide into rolls comprising 20–50 square yards. It is important not to cut the base of plastic film since this will be left in place to be used over and over again. To accomplish this, an area of the sod is lifted so that it is spaced above the plastic film and then cut without puncturing the film. Preferably, it is cut along space, generally parallel, vertical planes to form a ribbon of sod. This ribbon is then wound into the rolls. The big rolls are lifted onto a flat bed truck and transported to the installation site. On the basis of weight, the synthetic sod has been running about 50% and lighter with only one-fifth as many seams as one of our conventional mineral sods.

Further savings are obtained at the laying site where only the grading tractor is needed to unload and unroll the sod. One laborer, the hand raker, is helpful in positioning and cutting the sod rolls as needed. Those familiar with conventional US sodding will immediately recognize that a form lift, pallets, and a laying crew have been eliminated.

An indirect advantage is also conferred on the synthetic sod by the nature of the system. The primary root system has been harvested intact and when the sod is laid on the new site, it requires much less water to become established in comparison to conventional sod, where most of the root system has been cut off in the harvesting and has to reform.

While certain preferred embodiments of the present invention have been disclosed in detail, it is to be understood that various modifications may be adopted without departing from the spirit of the invention or scope of the following claims.

I claim:

1. A method for producing and stabilizing sods having substantially less weight than conventional sods, the method comprising:
   (a) placing a layer of selected vegetative mulch upon a root impervious barrier sufficient to form a continuum, said mulch comprising an additional amount of a vegetative growing material; said vegetative growing material selected from the group consisting of plugs, stolons, springs, and mild sod;
   (b) infiltrating a suitable growing medium into the interstices of the mulch to form a stable mulch/medium/matrix;
   (c) planting seeds into the mulch/medium/matrix;
   (d) applying a fine mulch to the top of the matrix to further stabilize the sod;
   (e) applying a nurse crop to the matrix for further stabilization;
   (f) allowing the seeds and vegetative planting material to produce primary rooting sufficient to bind the mulch/medium/matrix into a strong sod;
   (g) growing the sod sequentially in contiguous beds that are sized in economical units that lend themselves to daily production;
   (h) harvesting a sod.

2. A method in accordance with claim 1 wherein the vegetable mulch comprises material selected from the group consisting of pine needles, ground corn cobs, shredded wood barks, shredded paper, pelletized newspaper, oat or barley straw, hay, and waste paper pulp.

3. A method in accordance with claim 1 wherein the vegetative mulch comprises in part milled sod of the type of grass that is to be planted.

4. A method according to claim 3 comprising growing of sod to be milled in a light, mulch/medium/matrix.

5. A method according to claim 3 wherein the milled sod is supplemented with other mulches to maintain a continuum over the plastic.

6. A method in accordance with claim 1 wherein the growing medium comprises a material selected from the group consisting of municipal and industrial solid wastes, flume sand, regular sand, diatomaceous USGA Spec Sand for golf greens.

7. A method in accordance with claim 1 wherein vegetative growing material is being selected from the group consisting of stolons, plugs, sprigs, cuttings, or milled sod of bermudagrass, bahiagrass, centipedegrass, zoyziagrass, buffalograss, or St. Augustinegrass.

8. A method in accordance with claim 1 wherein the sods comprise crown vetch and ryegrass.

9. A method in accordance with claim 1 wherein the sods comprise prairie grasses or wildflowers or combinations of the two.

10. A method in accordance with claim 1 further comprising utilizing the primary rooting of the sod on the impervious barrier as a filtration system.

11. A method in accordance with claim 1 further comprising using the impervious barrier over again for subsequent crops.

12. A method in accordance with claim 1 further comprising practicing the main elements of sod production, planting and harvesting daily.

13. A method in accordance with claim 1 further comprising keeping the ground under the impervious barrier dry.

14. A method in accordance with claim 1 wherein exposure of the impervious base to UV light is reduced.

15. A method according to claim 5 wherein harvesting the sod is conducted after the vegetable part of the mulch/medium/matrix has decomposed.

16. A method in accordance with claim 1 comprising planting seeds together with the growing medium.

* * * * *